(12) United States Patent
Hill et al.

(10) Patent No.: US 8,675,077 B2
(45) Date of Patent: Mar. 18, 2014

(54) ALIGNMENT METROLOGY AND RESOLUTION MEASUREMENT SYSTEM FOR IMAGING ARRAYS

(75) Inventors: Henry A. Hill, Tucson, AZ (US); David W. Gardner, Colorado Springs, CO (US)

(73) Assignee: Flir Systems, Inc., Wilsonville, OR (US)

( * ) Notice: Subject to any disclaimer, the term of this patent is extended or adjusted under 35 U.S.C. 154(b) by 1383 days.

(21) Appl. No.: 12/178,488

(22) Filed: Jul. 23, 2008

(65) Prior Publication Data

US 2010/0020180 A1    Jan. 28, 2010

(51) Int. Cl.
*H04N 17/00* (2006.01)
*H04N 17/02* (2006.01)
*H04N 3/14* (2006.01)
*H04N 5/335* (2011.01)
*H04N 5/225* (2006.01)
*G02B 13/16* (2006.01)

(52) U.S. Cl.
USPC ............ 348/187; 348/294; 348/335; 348/360

(58) Field of Classification Search
USPC ......... 348/135–142, 180, 187–188, 294, 335, 348/360
See application file for complete search history.

(56) References Cited

U.S. PATENT DOCUMENTS

| | | | | |
|---|---|---|---|---|
| 4,383,170 A * | 5/1983 | Takagi et al. | ................. | 348/335 |
| 4,783,701 A * | 11/1988 | Ishida et al. | ................. | 348/362 |
| 4,818,865 A * | 4/1989 | Matsui et al. | ................. | 396/106 |
| 5,068,737 A * | 11/1991 | Taniguchi et al. | ............ | 348/350 |
| 5,838,428 A * | 11/1998 | Pipitone et al. | ............... | 356/3.09 |
| 6,483,950 B1 * | 11/2002 | Wallack | ....................... | 356/4.09 |
| 2006/0018650 A1 * | 1/2006 | Ichimiya | ........................ | 396/104 |
| 2007/0002159 A1 * | 1/2007 | Olsen et al. | .................... | 348/335 |
| 2007/0258710 A1 * | 11/2007 | Yamasaki | ..................... | 396/121 |

* cited by examiner

*Primary Examiner* — Pankaj Kumar
*Assistant Examiner* — Randy Flynn
(74) *Attorney, Agent, or Firm* — Haynes and Boone, LLP

(57) ABSTRACT

An alignment metrology and resolution measurement system concurrently determines the alignment of an imaging array in six degrees of freedom relative to an external reference frame, and further determines the resolution of the imaging array. To achieve this, an image of at least three mask patterns is projected on the imaging array. First and second positions of the imaging array relative to first and second coordinate axis of the reference frame is obtained using pixel positions of the images along the first and second axis. A first rotational position of the imaging array about a third coordinate axis is obtained using pixel positions of the images along the first and second axes. The third position and the second and third rotational positions of the imaging array about the first and second coordinate axis are determined using feature widths of focus images of the patterns and distances between the mask patterns.

19 Claims, 10 Drawing Sheets

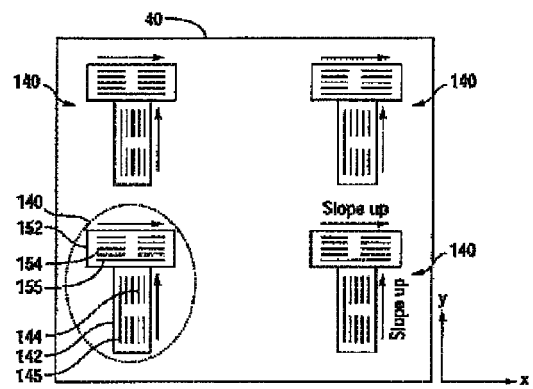
FIG 14
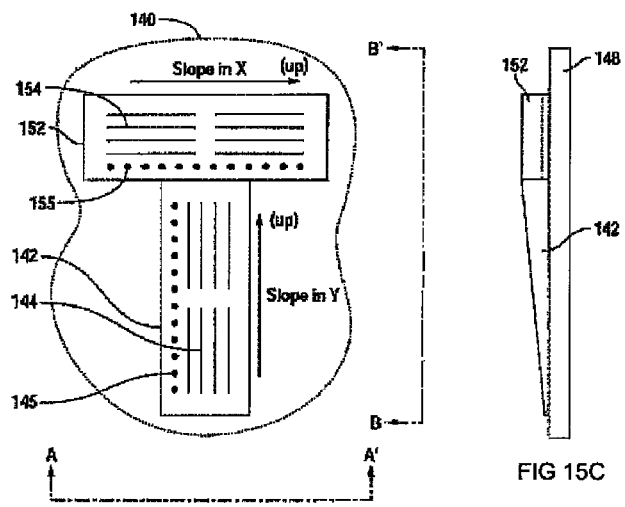
FIG 15A
FIG 15C
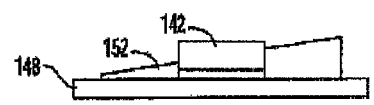
FIG 15B

ALIGNMENT METROLOGY AND RESOLUTION MEASUREMENT SYSTEM FOR IMAGING ARRAYS

BACKGROUND OF THE INVENTION

The present invention relates generally to alignment metrology and resolution measurement systems for imaging arrays within a housing, and in particular, to the alignment of an area CCD or CMOS optical imaging array within a camera housing.

Digital camera systems, which incorporate a variety of optical imaging array detector configurations, have become a common image capture technology. Imaging array technologies include for example, charged-coupled device (CCD) or metal-oxide semiconductor (CMOS) detectors. The imaging array is a geometrically regular array of typically millions of light-sensitive regions that capture and store image information in the form of localized electrical charge that varies with incident light intensity. Each of the light-sensitive arrays is called a pixel.

For certain high performance applications, digital camera systems require accurate positioning, or alignment, of the optical imaging array relative to an external reference coordinate system, such as the housing that it sits within. For example, in most surveillance platforms, several imaging systems of different types (for example, infra-red (IR), color, low light, short wave infra-red (SWIR)) all look at the same target either through common optics or through a multiple port arrangement. It is critical from a targeting point of view that these several imaging systems are all aligned; that is, bore-sighted. A SWIR laser may be used to designate a target, but this laser may only be visible to the SWIR sensor. However, the SWIR sensor is limited in what it can see, and the other imaging systems serve to distinguish or determine other factors about the target. The image data gathered by the individual imaging systems are then fused together to provide a composite image or view of the target and its surroundings. Thus, in this case, bore-sighting or alignment of the various imaging systems, including the digital lowlight CCD camera, is critical because misalignment may give rise to artifacts which can cause false alarms.

Lowlight imaging systems typically have low F-number optical paths. This means that the depth of focus can be very small. Therefore, any error along the optical axis (typically denoted as the Z-axis) or tilt of the imaging plane can cause focus problems, either globally across the entire image, or in certain regions of the image. This is another reason that accurate alignment of the imaging array with an external coordinate system is needed.

Knowing the relative position of the imaging array with respect to the external coordinate system provides several additional benefits. First, for those applications whose image processing includes fusion of data from more than one imaging systems, having systems of known alignment relative to an external coordinate system can allow for faster overall imaging processing. In particular, the image data sets from misaligned cameras will need to be individually aligned or manipulated prior to fusion or combination of the separate sets into a composite image. This data alignment step is time consuming and often causes delays in the data pipeline. A second advantage of having a well-aligned imaging array with respect to its housing or other external coordinate system is the maintenance and ease-of-use and cost factor: a camera assembly whose imaging array is well aligned to an external reference coordinate system such as its housing does not need external adjustment mechanisms nor does it need special procedures or specially skilled or trained personnel to align in situ.

Therefore, a need continues to exist for an apparatus and method of aligning the imaging array in all six degrees of freedom (x, y, and z directions and rotationally about these three axes) relative to an external reference coordinate system such as a reference plane and/or lines on the camera housing. The three axes of rotation may or may not be orthogonal to each other. FIG. 1 illustrates the relationship between the imaging array (imager) and the housing or external reference coordinate system.

Certain applications for high performance digital cameras require operation in harsh environments such as very cold climates (outer space, high altitudes) or very warm climates (deserts). This means that the cameras are expected to remain in calibration over these temperature ranges. Hence, the alignment of an imaging array must provide accurate measurements over a wide temperature range of operation. As with most metrology tooling and methods, the accuracy of an apparatus and method for aligning the imaging array must be demonstrated.

Finally, since high performance digital cameras may be produced in high volumes, the alignment metrology apparatus and method should be relatively quick and straightforward to apply. Assuming the apparatus is calibrated, a single setup and measurement per unit under test that provide errors in all six degrees of freedom are desirable. In particular, more ideal would be the ability to extract all the information necessary to calculate the positional errors in all six degrees of freedom from a single image.

BRIEF SUMMARY OF THE INVENTION

In accordance with one embodiment of the present invention, a method of concurrently determining six degrees of freedom in position, orientation, and resolution of an imaging array relative to an external mounting coordinate system, such as an associated housing, includes, in part, projecting an image of at least three mask patterns on the imaging array. The mask on which the three mask patterns are formed includes resolution measurement patterns. A first coordinate position of the imaging array relative to the reference frame is computed using the pixel positions of the images along a first axis of the reference frame. A second coordinate position of the imaging array relative to the reference frame is computed using the pixel positions of the images along a second axis of the reference frame. A first rotational position of the imaging array about a third axis of the reference frame is computed using the pixel positions of the images along the first and second axes and the distances between the mask patterns along the first and second axes. In accordance with the method, a focus image of each of the mask patterns is provided on the imaging array. Using the feature widths of the focus images and the distance between the mask patterns along the second coordinate axis, a second rotational position of the imaging array about a first coordinate axis is computed. Similarly, using the feature widths of the focus images and the distance between the mask patterns along the first coordinate axis, a third rotational position of the imaging array about a second coordinate axis is computed. The method further includes, in part, measuring the resolution of the imaging array.

In one embodiment, the focus image of the mask patterns is attained by inserting a transparent medium, having a known index of refraction and thickness, between the mask and the imaging array.

In another embodiment, the three mask patterns are formed on sloped surfaces of the mask. In such embodiments, the method further includes, in part, using the computed first rotational position of the imaging array to achieve substantially similar projections of the three patterns on the imaging array, and computing a value representative of a change in position of the imaging array with respect to the reference frame and along the third axis so that after varying the position of the imaging array in accordance with such a value, for each sloped mask pattern, a first portion of an associated image projected on a first side of an in-focus position of the associated image is substantially similar to a second portion of the associated image projected on a second side of the in-focus position of the associated image.

In one embodiment, each of the three mask patterns includes a modular transfer function pattern having disposed therein arrays of alternating lines and spaces of fixed or varying widths.

In one embodiment, the method further includes placing a camera away from the first mask, inserting a second mask at substantially the same location as the imaging array to be tested, moving the camera to a first position so as to achieve a focus images of the patterns of the first mask on the camera, moving the camera to a second position so as to achieve a focus image of the patterns of the second mask on the camera, and determining a distance between the first and second positions of the camera. The distance represents a value for use during a calibration routine. The second mask includes at least three patterns each associated with one of the three patterns of the first mask. In one such embodiment, the focus of the patterns of the first mask is characterized by a substantially minimum point of a plot of widths of the projected images of the patterns of the first mask as a function of positions of the camera. In another such embodiments, the focus of the patterns of the second mask is characterized by a substantially minimum of a plot of widths of the projected images of the patterns of the second mask as a function of positions of the camera.

In one embodiment, at least one of the patterns of the first mask includes arrays of lines and pinholes. In another embodiment, the reference frame is a camera housing in which the imaging array is disposed.

In accordance with one embodiment of the present invention, an apparatus adapted to determine position, orientation, and resolution of an imaging array relative to a reference frame, includes, in part, an illumination source, and a first mask-lens assembly. The first mask-lens assembly includes, in part, a first mask, a first relay optics, and a transparent medium characterized by a known index of refraction and thickness and adapted to be inserted between the first mask and the first relay optics. The first mask includes at least three patterns. The first relay optics includes at least three pairs of relay lenses. Each such pair is associated with one of the three mask patterns of the first mask and is adapted to form an image of the associated mask pattern on the imaging array when the illumination source is energized.

One embodiment of the apparatus, in accordance with the present invention, further includes a second mask-lens assembly. The second mask-lens assembly includes a second mask and a second relay optics. The second mask includes, in part, at least three patterns each having a one-to-one correspondence with one of the three patterns of the first mask. The second relay optics includes at least three pairs of relay lenses. Each such pair is associated with one of the three mask patterns of the first and second masks and each is adapted to form images of the associated first and second mask patterns on an external camera.

In one embodiment, each of the three mask patterns of the first mask includes a modular transfer function pattern having disposed therein arrays of alternating lines and spaces of fixed or varying widths.

In accordance with another embodiment of the present invention, an apparatus adapted to determine position, orientation, and resolution of an imaging array relative to a reference frame, includes, in part, an illumination source, and a first mask-lens assembly. The first mask-lens assembly includes, in part, a first mask, and a first relay optics. The first mask includes at least three patterns at least one of which is formed on a plane substantially non-perpendicular to an optical axis of the apparatus. The first relay optics includes at least three pairs of relay lenses. Each such pair is associated with one of the three mask patterns of the first mask and each is adapted to form an image of the associated mask pattern on the imaging array when the illumination source is energized.

In one embodiment, each of the three mask patterns of the first mask includes a modular transfer function pattern having disposed therein arrays of alternating lines and spaces of fixed or varying widths.

In accordance with another embodiment of the present invention, a mask adapted for use in determining a position and rotation of an imaging array relative to a reference frame, includes one or more patterns sloped substantially non-parallel to the imaging array.

BRIEF DESCRIPTION OF THE DRAWINGS

FIG. 14 is a front view of another embodiment of a mask 40

FIG. 15A is a top view of a portion of the mask of FIG. 14, having sloped patterns in both X and Y directions, in accordance with one embodiment of the present invention.

FIGS. 15B and 15C are side views of the mask shown in FIG. 15A.

DETAILED DESCRIPTION OF THE INVENTION

Although the following description is provided at times with reference to a charge coupled device (CCD), it is understood that the present invention equally applies to any other imaging arrays, such as a complementary metal oxide semiconductor (CMOS), etc. An alignment metrology and resolution measurement system for an imaging device, such as a CCD camera, in accordance with the present invention, is used to determine the alignment of a photosensitive area of a CCD chip (or imaging array) disposed in the CCD camera in six degrees of freedom relative to an external reference coordinate system. The camera housing may be used as the external reference coordinate system. The resolution measurement subsystem is used to determine the limiting resolution of the CCD camera. In accordance with the present invention, errors in all six degrees of freedom of the location of the imaging array relative to the location of the external reference coordinate system are concurrently determined.

Figure 1:
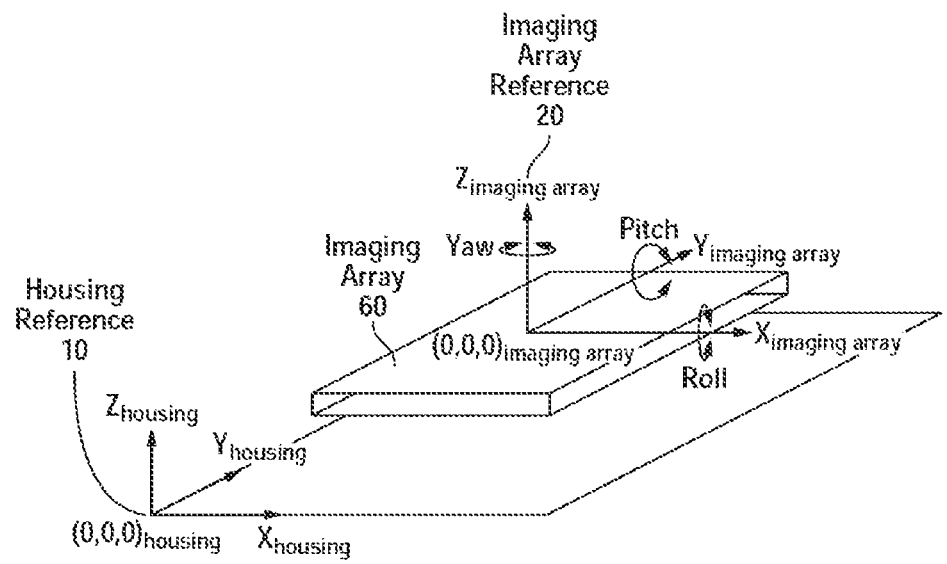
FIG. 1 shows an imaging array's coordinate system with respect to the reference coordinate system of the camera housing in which the imaging array is disposed.

FIG. 1 shows an imaging array 60, which may be a CCD or CMOS array, that includes a two-dimensional array of pixels having a coordinate system 20. Imaging array 60 is shown in relationship to a camera housing having a defined reference system 10. The physical relationship includes a mounting mechanism (not shown) that is capable of adjusting the X, Y, and Z positions and rotational positions about the respective X, Y, and Z axes of the imaging array 60 relative to the reference frame, such as the housing's coordinate system 10. In accordance with embodiments of the present invention, the correct positional relationship of the imaging array 60 with respect to the housing (or other external) coordinate reference system 10 in all six degrees of freedom is determined. Thereafter, necessary adjustments are made and verified to ensure that the adjustments are correct. An alignment metrology, in accordance with the present invention, is adapted to provide and verify alignment of the imaging array within the camera across a wide temperature range, e.g., −40 C. to +70 C.

Figure 2:
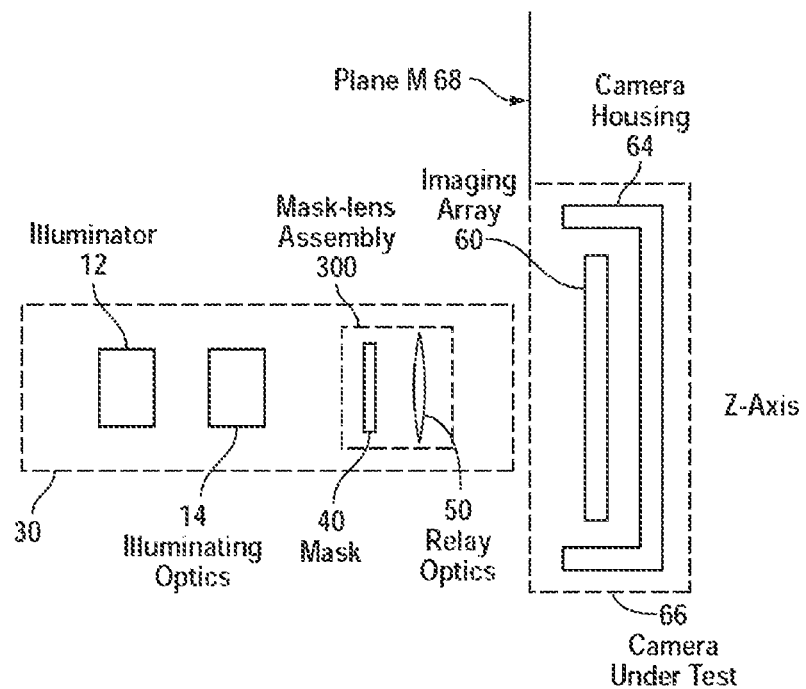
FIG. 2 shows various components of an alignment metrology and resolution system adapted to align the position and rotation of an imaging array with respect to a housing in which the imaging array is disposed, in accordance with one embodiment of the present invention.
Figure 3:
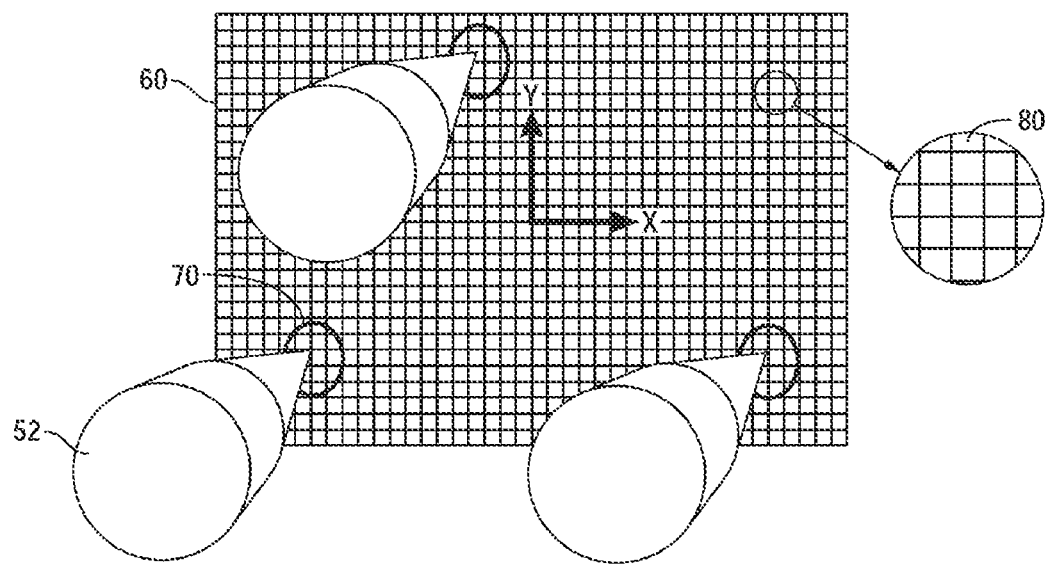
FIG. 3 is a schematic view of an imaging array having projected thereon three mask images.

FIG. 2 shows an alignment metrology and resolution measurement system 30 for aligning the position and rotational position of an imaging array 60 with respect to housing 64 and for measuring the limiting resolution of the imaging array, in accordance with one embodiment of the present invention. Hereinafter, the alignment metrology and resolution measurement system shall be referred alternatively as the alignment system, with resolution measurement capability implied. The imaging array 60 together with camera housing 64 form a camera under test 66. The camera housing usually serves as the reference for mounting to a larger optical system (not shown); for example, along plane M 68. Alignment system 30 is shown as including, in part, an illumination source 12, and an illumination optical delivery system 14 that provide an illumination beam on a mask 40 whose images are then projected onto the imaging array 60 through a set of relay lens pair optics 50. Mask 40 together with relay lens pair optics 50 is shown as forming a mask-lens assembly 300. Measurement of any plane requires a minimum of three points. Therefore, for highest measurement accuracy of the position and rotational position of the plane of the imaging array 60, at least three images need to be projected at different positions on the imaging array's surface. FIG. 3 shows three such images 70 being projected onto the surface of the imaging array 60. In accordance with one embodiment of the present invention, relay lens pair optics 50 includes at least three sets of relay lens pairs 52, each of which has a one-to-one correspondence with a pattern on the mask 40.

Referring to FIG. 1 and FIG. 3 concurrently, the plane of the active imaging array 60 is shown as being the X-Y plane of the imaging array's coordinate system. The active imaging array is schematically shown in FIG. 3 as including an array of pixels 80 whose size dimensions and spacing dimensions are known and can be verified using, for example, an optical microscope with a calibrated reticule. For example, sensor model number TC246RGB-B0 commercially available from Texas Instruments includes an array of 658 pixels by 496 pixels, and each pixel is 10 micrometers square. The pixel array may be used to locate mask images that are projected onto it in terms of pixel coordinates which may be further translated into linear dimensions relative to a selected origin. The origin may be a corner of the full array, or it may be the center of the array. In this way, the X and Y positions as well as yaw of the imaging array may be determined relative to the coordinate system of the mask.

In FIGS. 1 and 2, the Z direction is shown to be along the optical axis. One method of determining Z location is to make use of the optical system's focus. In other words, the Z location may be determined if the degree of focus can be determined, with the in-focus position designated as Z=0. Accordingly, the remaining three degrees of freedom, namely the Z position, pitch, and roll can also be defined. Accuracy of X, Y and yaw measurements can be optimized by using as much of the imaging array's X, Y expanse as is practical.

Embodiments of the present invention provide a repeatable and accurate method and apparatus for measuring focus so as to extract high accuracy Z position information. In accordance with one embodiment of the present invention, the focus is measured by changing the optical path length by inserting a material of known thickness and known index of refraction. In accordance with a second embodiment of the present invention, a mask plane that is tilted a known and measurable amount may be projected through the lens array onto the photosensitive area of the CCD imaging array. In accordance with a third embodiment of the present invention, several mask planes positioned at known distances relative to each other may be projected through the lens array onto the photosensitive area of the CCD imaging array. Such embodiments relate to the configuration of the mask-lens assembly 300 and are described in more detail below. Other arrangements are also possible.

Figure 4:
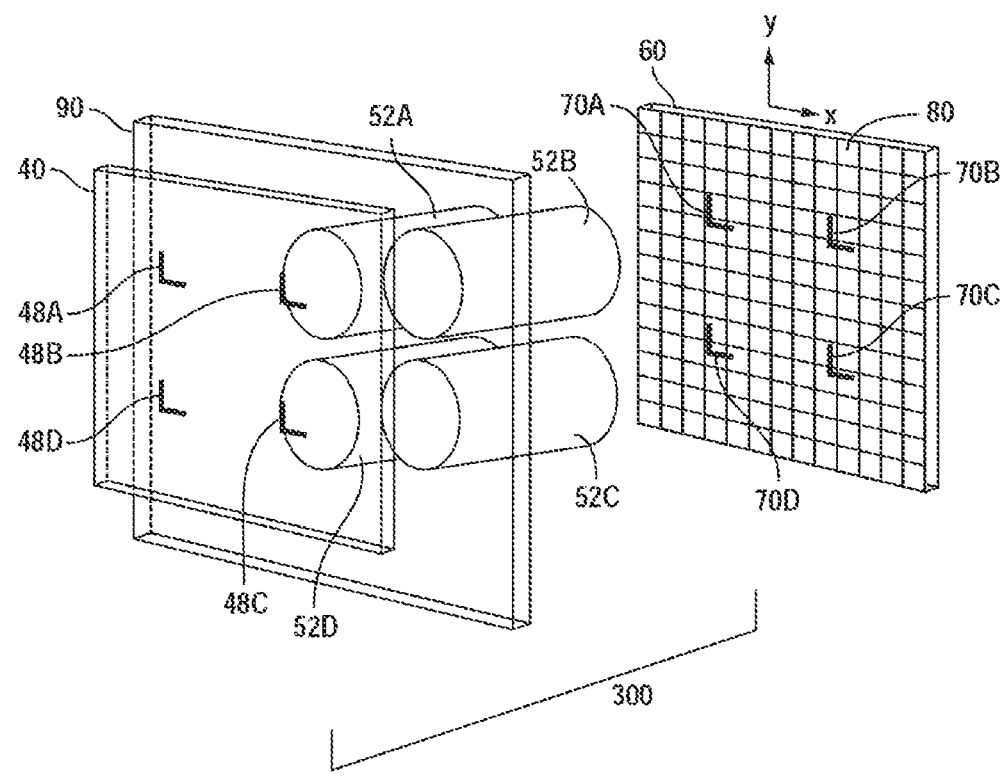
FIG. 4 shows a mask-lens assembly that includes a mask and relay optics arranged so as to allow a transparent material of known thickness and known index of refraction to be inserted therebetween, in accordance with one embodiment of the present invention.

FIG. 4 is an exemplary embodiment of a mask-lens assembly 300 (also see FIG. 2) shown as including a mask 40 and relay lens pair optics 50 arranged to allow a transparent medium 90 of known thickness and known index of refraction to be inserted therebetween. In FIG. 4, the relay optics is shown as including four identical relay lens pair elements 52A to 52D, each having an optical axis that is aligned with a corresponding feature 48A to 48D of mask 40. As illustrated in FIG. 4, mask features or patterns 48A, 48B, 48C, 48D are projected through their respective relay lens pairs 52A, 52B, 52C, 52D, to form respective images 70A, 70B, 70C, 70D on the imaging array 60. More lens pair elements may be used but no less than three may be used. Relay lens pairs 52A, 52B, 52C, 52D have relatively large numerical apertures (NA</~0.4) for imaging different portions of the mask onto respective locations on the imaging array 60. The relatively large numerical apertures are used to generate a high sensitivity to errors in the six degrees of freedom using measurements of a set of relative image spot diameters and locations.

Figure 5:
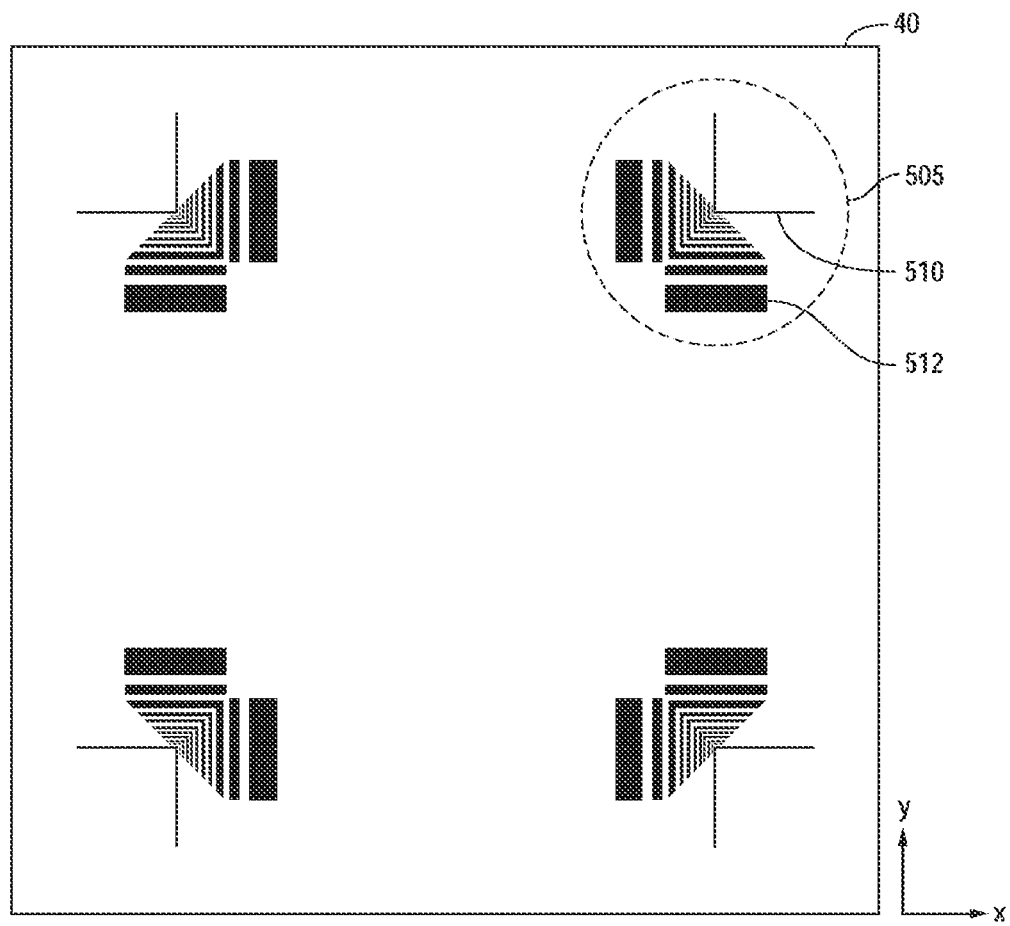
FIG. 5 shows lines and modular transfer function patterns formed on a mask, in accordance with one embodiment of the present invention.

Referring to FIG. 5, in accordance with one embodiment of the present invention, the mask may consist of a pattern of lines or other geometries such as pinholes that is repeated in different orientations and arranged in different locations on the mask. In FIG. 5, mask 40 is shown as including four pattern sites, with each pattern site being represented by a pattern of lines 505. Each pattern of lines 505 is shown to include slit pairs 510 that are "L" shaped, i.e., consisting of two lines that are orthogonal to each other. In the exemplary embodiment of mask 40 shown in FIG. 5, the slit pairs 510 are oriented along the (x,y), (x,−y), (−x, −y), and (−x, y) directions. Other arrangements of lines or geometries may be used in place of the slit pairs 510.

As shown in FIG. 5, each pattern site 505 may include a modular transfer function (MTF) pattern 512 which is typically an array of alternating lines and spaces of particular widths or varying widths so as to enable resolution measurements. The range of varying spacing and line widths may be, for example, from 40 micrometers to 250 micrometers, which enable measurement of resolution of the imaging array from 25 line pairs per mm to 4 line pairs per mm, respectively. In the example shown in FIG. 5, the MTF pattern is shown as including an array of orthogonal lines and spaces. Other embodiments of a MTF pattern are possible, for example, an array of parallel lines, or other arrangements that allow measurement of a contrast ratio between alternating lines and spaces of particular widths may be used.

Mask 40 is a transparent substrate such as glass or fused silica, and has one surface coated for example with chrome, e.g. an AR3 coating widely used in the industry. The remaining surface of the substrate is coated with an anti-reflection (AR) layer. The mask includes patterns of arrays of lines or slits, such as patterns 505 shown in FIG. 5, that are etched through the chrome. Other patterns such as pinholes may also be etched through the chrome. The chrome coating is approximately, for example, 100 nm thick. The various patterns that may include lines, such as lines 510, pinholes or other features, are generated, for example, by lithographic techniques well known to someone skilled in the art.

Figure 6:
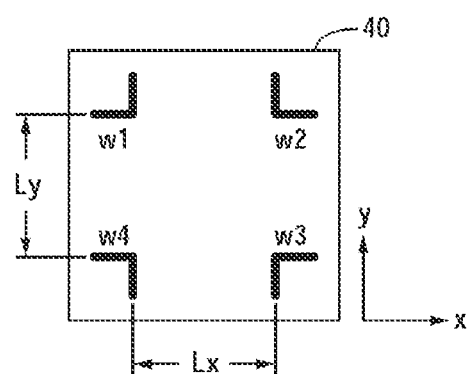
FIG. 6 shows the line patterns formed on a mask, in accordance with another embodiment of the present invention.

FIG. 6 is a simplified view of one example of mask 40 of FIG. 5, showing only the four oriented line (slit) pairs 510, which are labeled w1, w2, w3, w4. The average location of the four vertical line segments of the four slit pairs determines the location of the active CCD surface in the horizontal or X direction. The average location of the four horizontal line segments of the four slit pairs determines the location of the active CCD surface in the vertical or Y direction. The rotation about the Z axis (yaw) is determined by the difference of the four measured locations of the four crosses in the X and Y directions, as shown below:

$$\{[Y(w2)+Y(w3)]-[Y(w1)+Y(w4)]\}/Ly-\{[X(w1)+X(w2)]-[X(w3)+X(w4)]\}Lx \qquad (1)$$

where Lx and Ly represent the distances between vertices of the four line pairs w1 to w2 or w1 to w4, respectively.

Calibration of the absolute X-Y position can make use of the imaging array's well-defined pixel locations (see FIGS. 3 and 4). The center, or origin, of the X-Y position of the alignment system may be determined particularly if the distance between w1 and w2, namely Lx, and the distance between w1 and w4, namely Ly, as illustrated in FIG. 6, are equal and known, that is, if Lx equals Ly. In one embodiment, an image of the mask line pairs is captured first, then the mask-lens assembly 300 is rotated 180 degrees, and a second image of the rotated line pairs is captured. These two captured images are superimposed. The intersection of the midpoints of the two diagonal lines joining the line pair vertices in the composite images defines the XY-center of the alignment system in terms of the XY-coordinates of the imaging array. More specifically, at the zero degree rotation, an image is captured and the pixel locations of the vertices of w1 and w2 line pairs in FIG. 6 are then located on the imaging array. The mask-lens assembly 300 is rotated 180 degrees relative to the imaging array, and the pixel locations of the vertices of the w1 and w2 line pair locations are captured again. Assuming that the alignment metrology system is constructed in such a way as to permit very accurate mechanical rotations of 90 degrees and 180 degrees, then calculating the midpoints of the diagonal lines drawn between the pixel locations of w1 and w1-rotated and the pixel locations of w2 and w2-rotated provides the pixel position representing the XY-center of the mask-lens assembly. The offset of this pixel relative to the physical center of the imaging array is thus determined.

Figure 7:
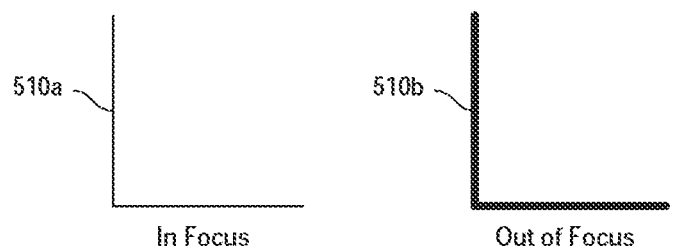
FIG. 7 shows in-focus and out-of-focus images of a mask line pair.

The imaging array's Z position can be determined by measuring focus, and more specifically, by measuring the widths of the slit line pairs that are imaged onto the imaging array whereby such widths indicate a degree of focus. In FIG. 7, slit line pair 510a represents an in-focus image of the mask pattern w2 of FIG. 6 and corresponds to a Z position=0, while slit pair 510b represents an out-of-focus image of the mask pattern w2 and corresponds to a Z position that is nonzero.

Figure 8A:
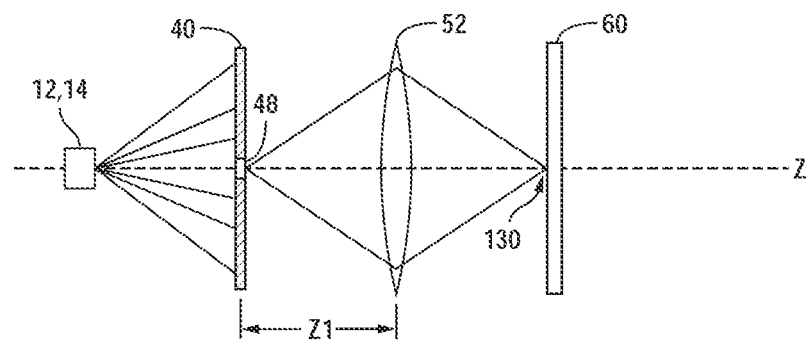
FIG. 8A shows the ray traces along the Z direction when no transparent medium is inserted in the optical path length between the mask and the relay lens pair.
Figure 8B:
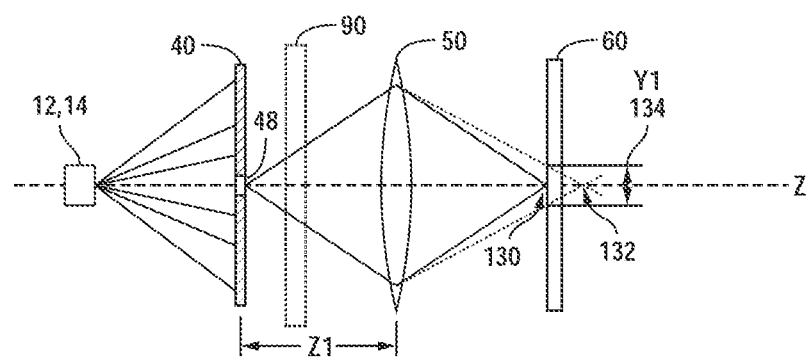
FIG. 8B shows the ray traces along the Z direction when a transparent medium is inserted in the optical path length between the mask and the relay lens pair.

FIGS. 8A and 8B are schematic ray traces of the general principle of one embodiment of the invention in which the optical path length Z1 along the Z-axis between the mask 40 and a relay lens pair 52 is varied. FIG. 8A is a schematic ray trace with no transparent medium present between mask 40 and relay lens pair. The mask feature 48 is imaged onto the plane of the imaging array 60, and is in focus at position 130 of imaging array 60. If, however, as shown in FIG. 8B, the optical path length Z1 is changed by inserting a transparent medium 90, the focal point 130 is shifted, for example, to Z position 132 away from the surface of imaging array 60. The path length change results in a blurred larger image at the surface of the imaging array 60; that is, the line width of the image increases to Y1 134. The optical path length Z1 may be changed by different amounts by varying the thickness of transparent medium 90, which may be glass, or other material that transmits the wavelength of the illumination source 12. Optical path length change is a function of the material thickness and the index of refraction of the transparent medium 90. The optical path change is defined by the expression (N−1)T, where N and T respectively represent the index of refraction and the thickness of inserted medium 90. As is known, N is approximately 1.5 for glass. Therefore, in the operational mode of the system schematically shown in FIGS. 8A and 8B, the Z position of the imaging array may be determined by selecting and inserting a transparent medium 90 of known thickness and index of refraction in the optical path to provide a best focus of the projected mask image onto the imaging array. The resulting calculated shift in Z position equivalent to (N−1)T is the amount of offset the imaging array 60 must be adjusted relative to the housing reference coordinate system in order to lie at the desired Z position. The sign of the Z direction may be determined by noting whether the line width of the slit pair increases (positive) or decreases (negative).

Figure 9A:
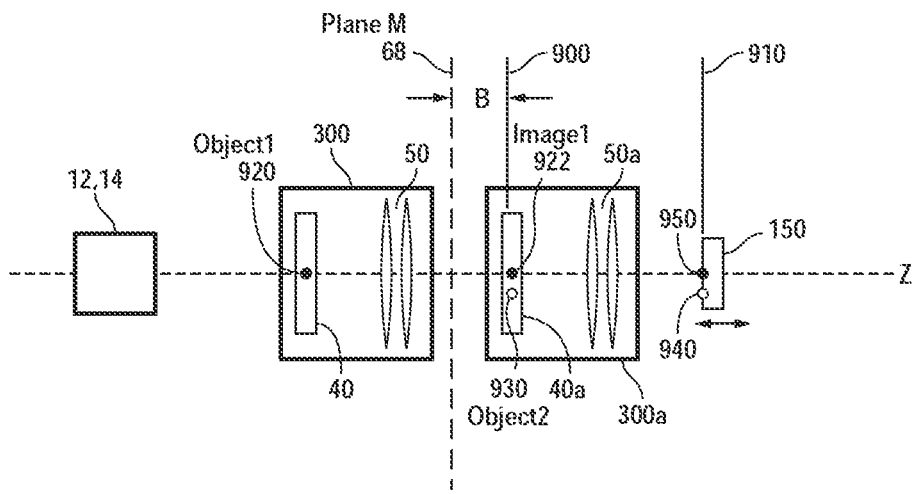
FIG. 9A is a schematic view of calibration along the Z axis using two mask-lens assemblies and a moveable camera, with the second assembly positioned at the desired imaging plane of the first mask-lens assemblies.
Figure 9B:
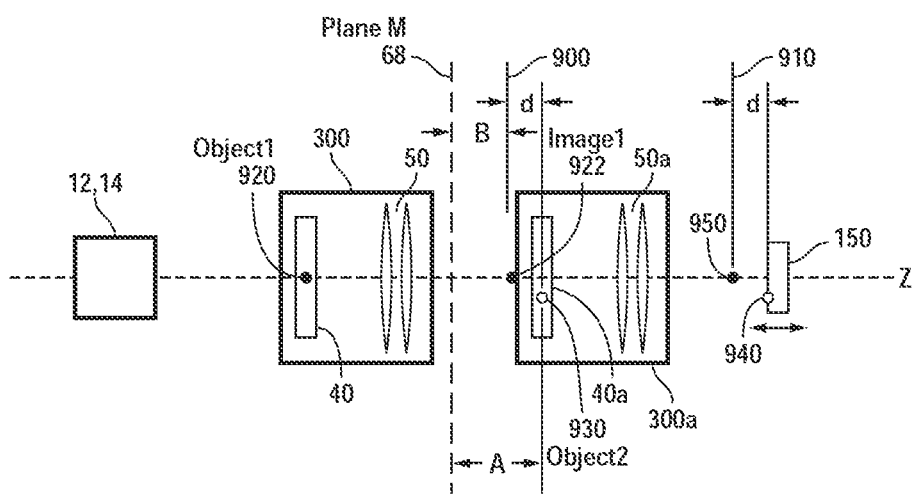
FIG. 9B is a schematic view of calibration along the Z axis using two mask-lens assemblies and a moveable camera, with the second mask-lens assembly offset from the desired imaging plane of the first mask-lens assembly.

However, as with X and Y, the distance along the Z-axis must be calibrated. FIGS. 9A and 9B are schematic diagrams of an arrangement of components used to achieve measurement of an absolute calibration along the Z direction. A second mask-lens assembly 300a, is placed at the output side of the first mask-lens assembly 300 at the position normally occupied by the camera under test (not shown). The first mask-lens assembly 300 is the unit that is used in the alignment system's operational mode. A measuring camera 150 is placed downstream of the second mask-lens assembly 300a. The mechanical holder for the second mask-lens assembly 300a is fabricated so as to place the second mask 40a of the second mask-lens assembly 300a at the same nominal plane 900 that the imaging array under test would sit, that is, at a distance B from plane M 68, an external reference plane to which the camera under test is mounted. The mechanical holder (not shown) for the measuring camera 150 is designed to permit movement of the measuring camera along the Z axis over a range that crosses through the imaging plane 910 of the second set of relay lenses 50a of the second mask-lens assembly 300a.

Figure 10:
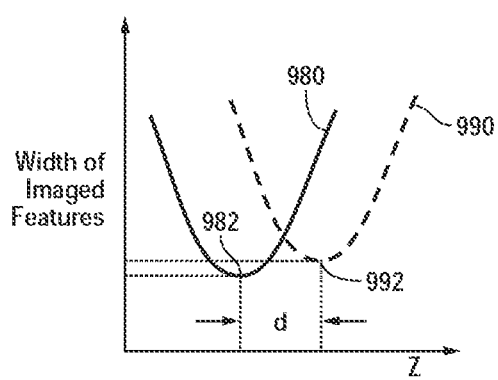
FIG. 10 shows plots of the width of the imaged features of the first and second masks as a function of the measuring camera's position.

The second mask features (simplified and labeled as "Object2" 930, and drawn offset from the Z-axis for illustration purposes only) and the individual relay lens pairs 50a of the second mask-lens assembly 300a have a one-to-one correspondence with each other, and also with the first mask features (simplified and labeled as "Object1" 920), and with the individual relay lens pairs 50 of mask-lens assembly 300. The second relay lens pairs 50a project the combined images 940, 950 of the first mask and the second mask onto the imaging plane 910 of the measuring camera 150, as shown. Under ideal conditions, the second mask-lens assembly 300a would be positioned so that image 922 of the first mask 40 is projected onto the second mask 40a and therefore is coplanar with the feature 930 of the second mask 40a, and furthermore, the resulting image 950 of image 922 and resulting image 940 of mask feature 930 are coplanar when focused on the measuring camera 150, as illustrated in FIG. 9A. However, due to non-ideal conditions, e.g., imperfections in mechanical fabrication, second mask-lens assembly 300a may be shifted away from the ideal position thereby causing first image plane 900 to be displaced by an amount Z=d from mask 40a, as illustrated in FIG. 9B. This causes images 922 and 910 of object 920, respectively associated with relay lenses 50 and 50a, to be out of focus at the plane of the second mask 40 and measuring camera 150, respectively. Measuring camera 150 is adapted to move in the Z direction using a positioning device such as a linear stage with fine resolution (for example, micrometers) and control, or the like. Calibration of Z position is achieved by moving the measuring camera 150 along the Z-axis and recording the line widths of the images 950 of the projected first mask images 922 and the line widths of the projected second mask images 940 for each position of the measuring camera 150. Exemplary plots of the widths of the imaged features of the first and second masks as a function of the measuring camera's position is shown in FIG. 10. Plot 980 is associated with the widths of feature images of the first mask 40, and plot 990 is associated with the widths of feature images of the second mask 40a. The minimum point of each plot, i.e., point 982 of plot 980 and point 992 of plot 990, corresponds to the in-focus position of its associated mask image. The distance d between the minima is the measured Z offset between the first mask-lens assembly 300, used during operation, and the second mask-lens assembly 300a, used during calibration. Consequently, in accordance with one aspect of the present invention, an apparatus includes a second mask-lens assembly adapted to provide (a) correlation between Z-position and the line-widths of the projected images, and (b) the offset in Z direction between the first mask-lens assembly and the target imaging array. The offset value d is then applied as a correction factor during measurement of the imaging array under test, and measured line widths projected onto the imaging array under test may be converted to Z positions.

Since the mask has at least three measurement sites (FIG. 6 shows four such measurement sites, namely w1, w2, w3 and w4), a tilt of the imaging array under test may be determined by measuring the relative Z positions of each of the at least three sites. In particular, the average value of the at least three measured line-widths attained using Z-to-line-width calibration, as described above, determines the average location of the active CCD surface in the Z-direction. The sign of the Z direction is determined by inserting a transparent medium into the beam path and observing whether the line widths decrease (negative) or increase (positive). Referring, for example, to the mask shown in FIG. 6, the tilt about the X axis is determined by a difference of the four measured line-widths (attained using Z-to-line width calibration), as shown below:

$$\{[Z(w1)+Z(w2)]-[Z(w3)+Z(w4)]\}/Ly; \qquad (2)$$

and the tilt about the Y axis is determined by another difference of the four measured line-widths (attained using Z-to-line-width calibration) as shown below:

$$\{[Z(w1)+Z(w4)]-[Z(w3)+Z(w2)]\}/Lx \qquad (3)$$

As described above, in accordance with one embodiment of the invention, all six degrees of freedom of an imaging array may be determined concurrently. The X, Y positions and rotational positions about the Z axis may be calibrated and obtained using (1) the imaging array's pixel size, (2) pixel locations, (3) rows and columns of pixels relative to mask slit pairs or the like, and (4) the distances between the mask slit pairs. The Z position and tilts about the X and Y axes may be determined by correlating the line widths of the images of the mask slit pairs to Z position using a second mask-lens set, and then for an imaging array under test adjusting the optical distance between the respective masks and relay lenses until focus is found, and subsequently calculating a Z-position from the transparent medium thickness and any calibration offsets. Further, inclusion of a MTF pattern on the mask permits measurement of the limiting resolution of the imaging array. Hence, the imaging array in combination with a set of optics adapted to project known, calibrated line features onto different positions of the imaging array, provides sufficient information regarding (1) the X and Y position of the imaging array relative to the housing reference frame, (2) the rotation of the imaging array relative to Z-axis of the housing reference frame, (3) rotation about the X axis, (4) rotation about the Y axis, (5) focus (displacement along the Z-axis), and (6) resolution (MTF) of the imaging array system.

Figure 11A:
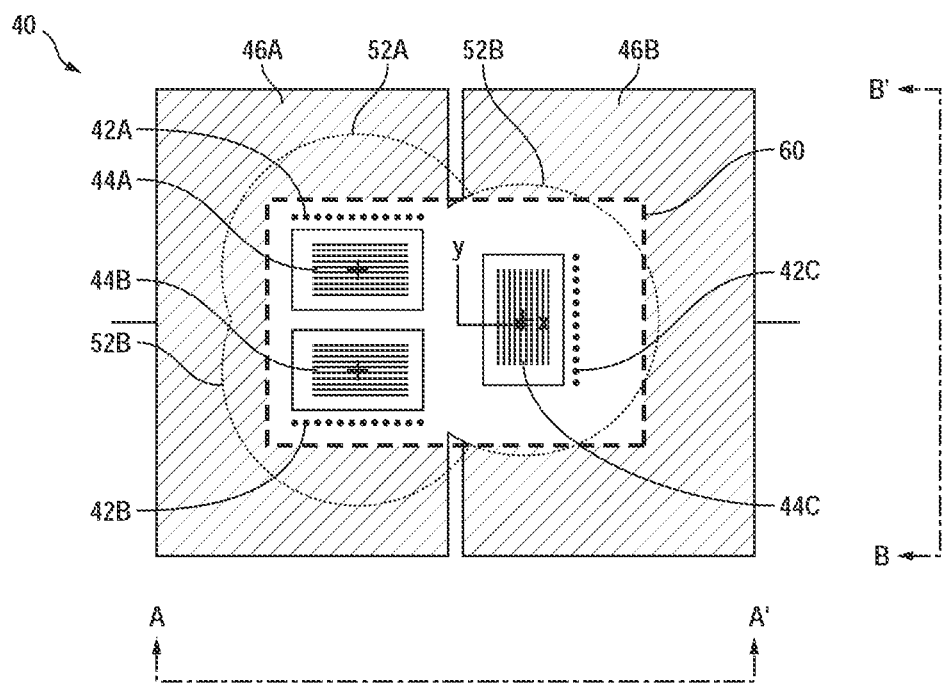
FIG. 11A is a front view of a mask having tilted components, in accordance with one embodiment of the present invention.
Figure 11B:
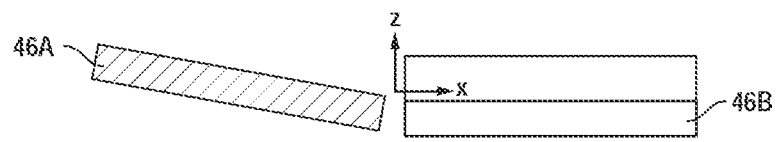
FIGS. 11B and 11C are side views of the mask shown in FIG. 11.
Figure 11C:
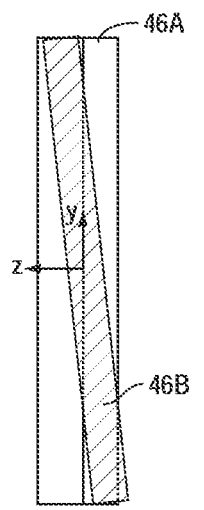

In accordance with another embodiment of an alignment metrology system of the present invention, mask elements are tilted within the mask assembly itself. FIG. 11A is a front view of a mask 40 having tilted elements 46A and 46B formed thereon. FIGS. 11B and 11C are side views of mask 40 of FIG. 11A respectively along views A-A' and B-B'. The photo sensitive region of the imaging array relative to the mask elements 46A and 46B is delineated using reference number 60. In this embodiment, the lens array 50 includes three lenses, 52A, 52B and 52C and the positions of which relative to mask elements 46A and 46B are shown. Each of the two mask elements 46A and 46B are tilted with respect to the nominal X-Y plane as defined by the housing coordinate system shown in FIG. 1. Mask element 46A, for example, may be sloped along the X direction, and mask element 46B may be sloped along the Y direction.

In the embodiment shown in FIGS. 11A, B and C, each mask pattern may include an array of pinholes 42A, 42B and a set of parallel lines 44A, 44B. The array of pinholes are parallel to the lines of the set of parallel lines used to measure the Z position and the displacement in a direction perpendicular to the parallel lines in the X-Y plane. In one embodiment, the pinholes are approximately 3 to 5 micrometers in diameter, i.e. less than or approximately equal to half of the size of a respective pixel of a CCD chip, which, in turn, is larger than the thickness of the AR3 chrome coating. In one embodiment, the lines are oriented parallel to the slope of a respective portion of the mask. In another embodiment, the lines may be oriented perpendicular to the slope of a respective portion of the mask. In yet another embodiment, a pattern that includes a first set of parallel lines and a second set of parallel lines oriented perpendicular to the first set of parallel lines may be formed on a single glass mask.

Referring to FIGS. 11A, B and C, the six degrees of freedom (X, Y, Z, and three corresponding angular degrees of freedom) of the imaging array may be measured concurrently and then adjusted using the sloped masks. The line patterns are accurately formed and positioned to be perpendicular either in X or Y direction. Therefore, in accordance with these embodiments, the pixels of the imaging array may be used to determine the X-Y locations as well as the rotation about the Z-axis. The sloped mask surfaces in these embodiments, enable measurement and calibration of the Z position when the slopes are accurately known. An error in the location of the photosensitive area of the CCD along the optic axis (Z-direction) will result in a change in the observed sizes of the respective line or pinhole images. The change in the sizes of the images can then be used to determine the magnitude of the error in the Z location. With the use of images in two different planes along the Z direction, the sign of the error is determined. In particular, a line that is sloped a known amount provides information about the location of the image plane, which in turn, corresponds to the brightest point, i.e. corresponding to an in-focus position, in the Z-direction. An apparatus and method using a second mask-lens assembly 300a and measuring camera 150 shown in FIGS. 9A and 9B may be used to calibrate Z, and more specifically, determine offset distance d, and Z position relative to the size of the imaged features.

Figure 12A:
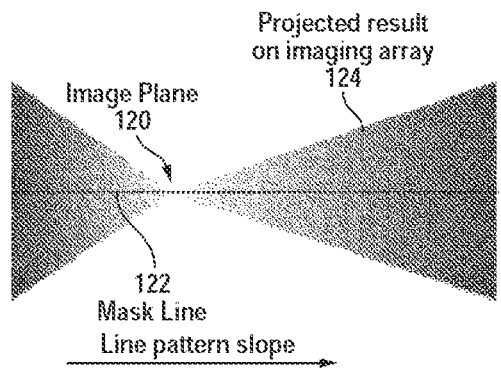
FIG. 12A shows an image projected on an imaging array when the mask used in accordance with the present invention has a sloped surface.
Figure 12B:
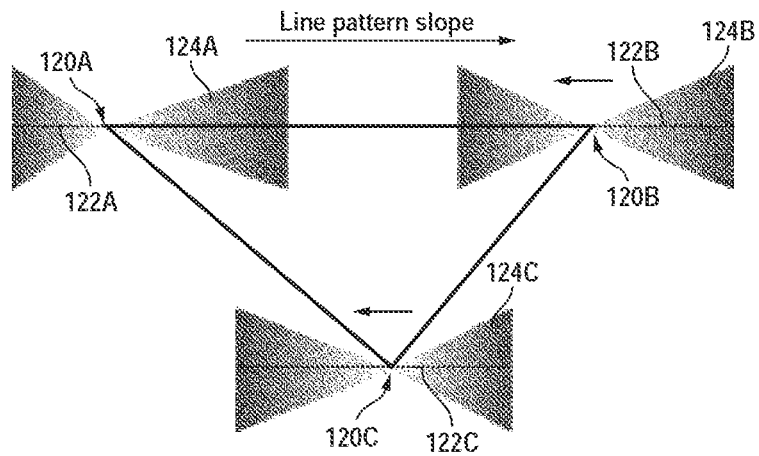
FIG. 12B shows images of three sloped mask patterns when focus and tilts about a number of axes are not corrected.
Figure 12C:
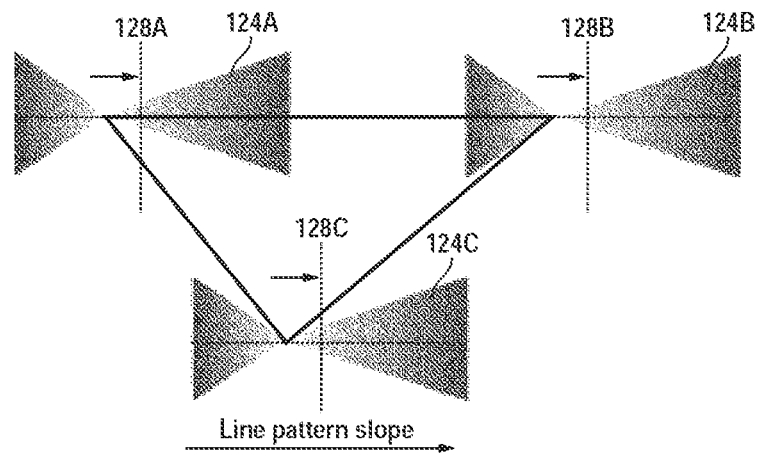
FIG. 12C shows the images of three sloped mask patterns after the corrections for the tilts about the axes have been applied.
Figure 12D:
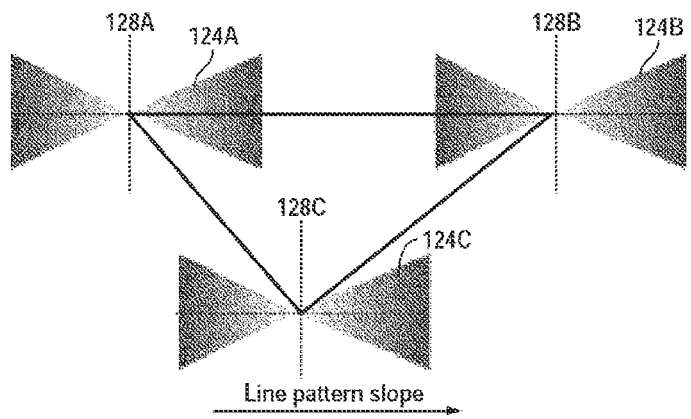
FIG. 12D shows the images of three sloped mask patterns after corrections for focus and tilts about the axes have both been applied.

FIG. 12A shows the image projected on an imaging array when the mask has a sloped surface. The figure shows the orientation of the slope of the line pattern 122 as well as the resulting image 124 and its brightest point (i.e., in-focus position) 120. FIG. 12D shows the resulting images of a well-positioned imaging array, and FIGS. 12B and 12C are included to illustrate resulting images of an image array that is not properly aligned. With the arrangement shown in FIG. 12B in which at least three sloped patterns, namely patterns 120A, 120B, and 120C which are associated with images 124A, 124B, and 124C that are spread over the imaging array, tilts or rotations about two axes (X and Y) may be measured and corrections deduced. In FIG. 12B, the Z position of the mask on which the sloped lines are formed is not corrected, because images 124B and 124C do not match image 124A. However, tilt corrections to the imaging array in the directions shown in the example of FIG. 12B may be made to make image 124B and image 124C similar to 124A. FIG. 12C shows the same patterns that might result if corrections were applied to tilt alignment only. Corrections of overall focus are included by applying equal Z changes to all three points so as to shift the in-focus positions 120A, 120B and 120C towards the nominal focus positions 128A, 128B, and 128C. FIG. 12D shows the final result, with each image 124A, 124B, 124C equivalently matching and focused equally. As was described with reference to the embodiment shown in FIG. 5, MTF line pair pattern arrays may be included in the mask shown in FIG. 11 (not shown) to measure the resolution of the imaging array.

Figure 13:
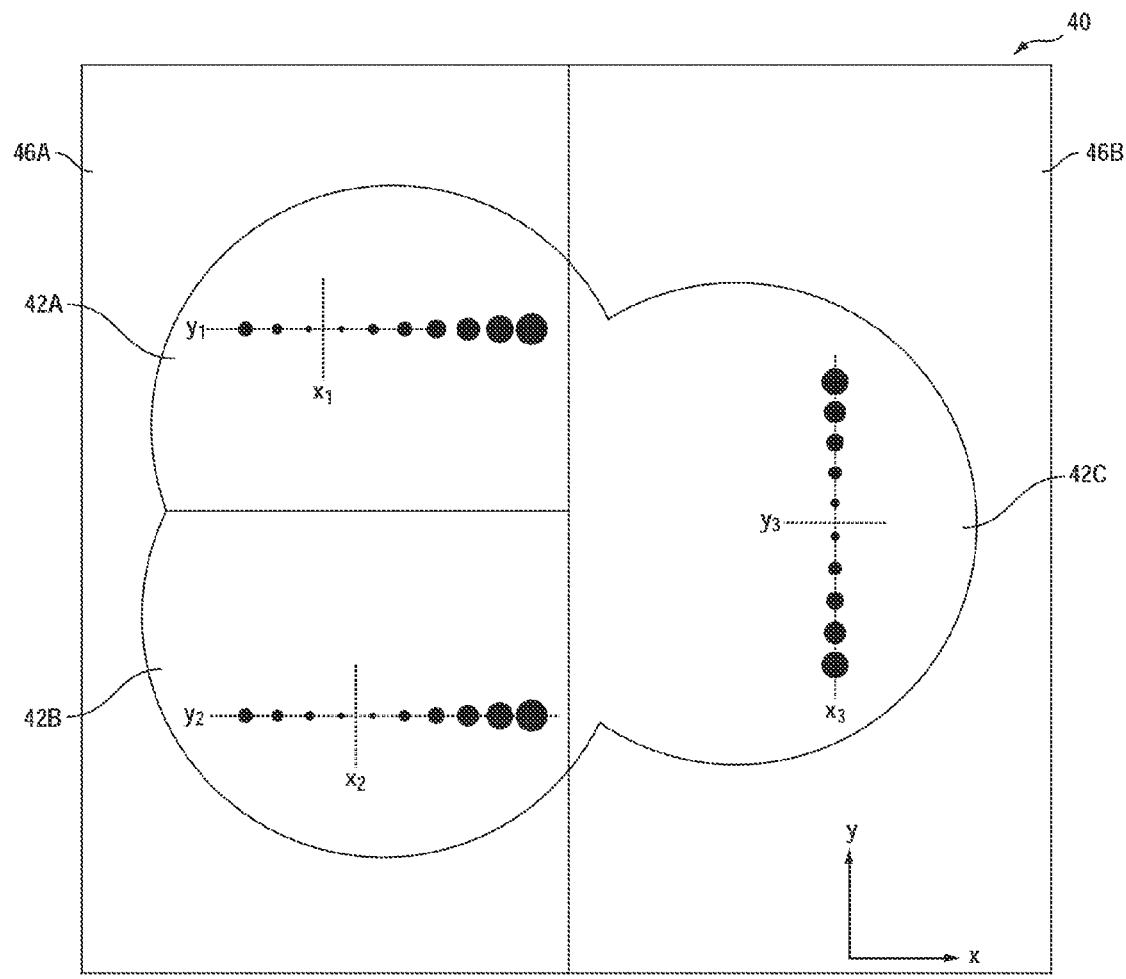
FIG. 13 illustrates images of a linear array of equally sized pinholes formed on a sloped mask surface.

FIG. 13 illustrates images of a linear array of equally sized pinholes 42A, 42B, 42C formed on a sloped mask surface. As in the case of the sloped line arrays shown in FIG. 12, the sloped pinhole arrays provide similar responses. The pinhole in focus has the smallest diameter, and the pinholes that are farther or closer to the imaging array are projected as with larger diameters.

FIG. 14 is a front view of another embodiment of a mask 40. In this embodiment, the mask includes four identical pattern arrays 140 arranged to cover the full extent of the imaging array's photo sensitive area. More or fewer than four pattern arrays may be used, with three pattern arrays being the minimum required to enable measurement of all six degrees of freedom. Each pattern is associated with its own relay optics 52, as shown in FIGS. 3 and 4. Each pattern array 140 is shown as including a first set 142 of features substantially perpendicular to the X axis, and a second set of features 152 substantially perpendicular to the Y axis. FIG. 15A illustrates a top view of one example of each pattern array 140 of the mask shown in FIG. 14. Feature set 142 includes an array of lines 144 and an array of pinholes 145 oriented substantially perpendicular to the X axis. Feature set 152 includes an array of lines 154 and an array of pinholes 155 oriented substantially perpendicular to the Y axis. In one embodiment, feature sets 142 and 152 may be identical but rotated 90 deg with respect to each other. In another embodiment, feature sets 142 and 152 may be different from each other.

FIGS. 15B and 15C are side views of pattern array 140 along views AA' and BB', respectively. In the example shown in FIGS. 15A to C, the patterns disposed in feature sets 142 and 152 are positioned at right angles to each other forming a "T" configuration. Feature set 152 is mounted on a slope along the X direction, while feature set 142 is mounted on a slope along the Y direction, as shown in the end and side views. Feature sets 152 and 142 may be printed on a transparent substrate such as glass or fused silica. The transparent substrates with such features are then each mounted on a sloped surface on the mask support structure 148. The slope angle is selected to enable sufficient resolution of displacements in the Z direction which are used to determine displacements in the Z-direction and two angular degrees of freedom.

The slope angle may be, for example, 6 degrees to 15 degrees. The etched patterns (feature sets) may include MTF line/spacing pairs to measure resolution, as described above.

Figure 16:
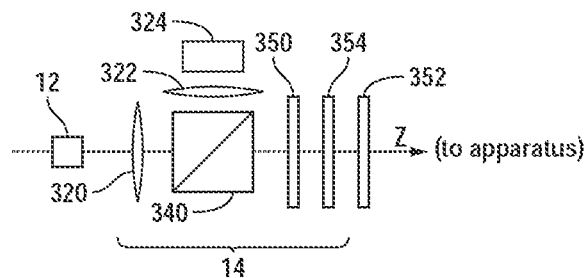
FIG. 16 shows illumination optics and an illumination source for use in accordance with one embodiment of the present invention

FIG. 16 shows illumination optics 14 and an illumination source 12, in accordance with one embodiment. The illumination source 12 may be, for example, a light emitting diode (LED), having a white spectrum (multi-wavelength), or it may have a single specific wavelength. A collimating lens 320 can make the LED light more uniform. A beam splitter 340 may be introduced to direct some of the light through a focusing lens 322 to an intensity measuring photodiode 324, which may serve as a monitor of intensity of beam incident on the photosensitive area of the imaging array 60. A diffuser 352 may further homogenize the beam uniformity, while neutral density filters 350 may be required to attenuate the intensity of the beam incident on the mask assembly. The wavelength of the illumination source may be varied by changing the illumination source, or by using a broadband source in combination with optical color filters or attenuators 354 and 350. The intensity of the illumination source may be varied by changing the source input power only or in combination with optical density filters comprising an attenuator. Thus resolution of the imaging array may be determined as a function of wavelength and intensity of the impinging illumination source.

In practice, the mask 40 and relay lens pairs 50 should be packaged in a holder that maintains the mechanical tolerances that are necessary to maintain the optical relationship between each feature set 48 on the mask and the corresponding relay lens pair 52. The mask and associated optics (300 in FIG. 2) may be one assembly while the illuminator and its associated optics (12, 14 in FIG. 2) may be combined into a separate assembly. Alternatively, both the illumination source with its optics and the mask with its optics may be combined into a single assembly. The mask-lens optics holder itself may be of any form, for example, cylindrical or rectangular. A cylindrical shape, with axis of rotation along the optical axis (Z) has an advantage in that the mask-lens may then be easily rotated about the Z-axis, relative to a measuring camera for calibration or relative to a camera under test. In the case of a cylindrical shape, however, the cylinder would also have to be keyed so as to align the mask, which will typically include rectilinear patterns, to the X-Y coordinates of the camera under test or measuring camera. Alternatively, a rectangular holder for the mask-lens assembly 300 may accomplish the same functions as a cylindrical holder, through the use of well placed tightly toleranced pins and holes. In particular, four degrees of freedom (X, Y and two associated tilts) may be calibrated by rotating the measuring camera relative to the mask-lens modular $\pi/2$. However, means of mounting the housing or other physical reference of the camera under test or the measuring camera to the mask-lens holder must also be repeatable and accurate. Well-placed tightly toleranced pins and holes, or stepped features, or other techniques well known in the assembly and placement of precision mechanics can be used to achieve highly repeatable placement accuracy between the mask-lens holder and camera. For the embodiment illustrated in FIG. 4, a means for holding inserted transparent media 90 may be a slot in the side of the holder apparatus that is perpendicular to the optical axis and located between the mask 40 and the relay lens optics 50.

Typical applications of the present invention require X, Y alignment to, for example, the subpixel level, Z alignment within less than ±100 micrometers, rotational alignment of the imaging array to the housing of less than 10 milliradians, and tilt of the imaging array plane within less than 15 milliradians. CCD imaging arrays have pixel sizes approximately 7 to 10 micrometers. Using precision machining techniques, alignment holes and pins between parts in the assembly may be held within a three micrometer accuracy. If alignment holes and pins are spaced at least 50 mm apart within the assembly, then tilt accuracies on the order of 100 microradians may be achieved, and error in rotation about the optical axis would be approximately 50 microradians. In practice, mask line pair features such as w1 to w4 in FIG. 6 may be approximately 1 millimeter long on a side and each line have approximately 10 micrometer width, and distance L between features w1 to w2 or between w1 and w4 may be approximately 4 millimeters. With distance L at approximately 4 millimeters, measurements of rotational angles about the Z axis using at least two feature sites can be as small as 1 pixel, or 10 micrometers out of 4000 micrometers, or 10/4000, or 2.5 milliradians, without additional corrections or extrapolations.

Cameras containing imaging arrays may be required to operate over a wide temperature range. Often a CCD imaging array may have a dedicated thermal management system, such as a thermal electric cooler (TEC), but the camera housing surrounding the imaging array is likely to be exposed to an environment with wide temperature range. For some applications, constancy of positional alignment of the imaging array within the camera housing across the temperature range is critical. An alignment metrology and resolution measurement system, in accordance with the present invention is capable of providing such constancy of the camera over the wide temperature range, and is thus designed to provide consistent results irrespective of temperature. This requirement may be met through careful selection of materials with matching coefficient of thermal expansion (CTE) properties and thermal effects on the index of refraction of lenses used in the measurement system. In one embodiment, all materials within the device have the lowest CTE possible. Suitable materials, for example, include Invar and ceramics for structural components and fused silica glass for transparent components.

Figure 17:
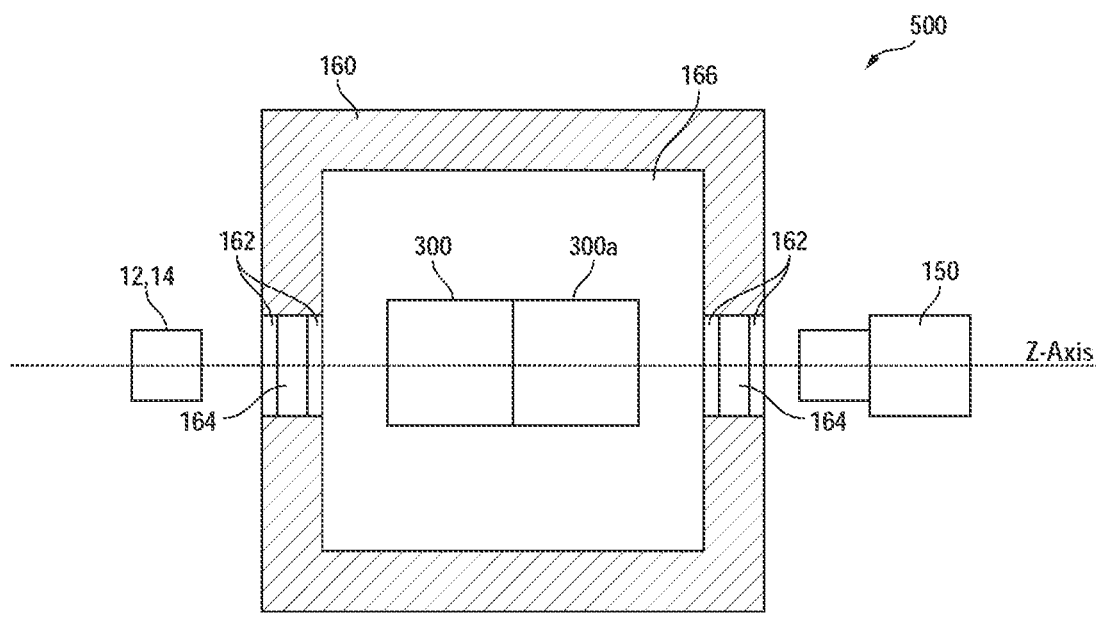
FIG. 17 illustrates an environmental chamber in which the alignment metrology and resolution measurement system in accordance with the present invention may be disposed.

An alignment metrology and resolution measurement system, in accordance with the present invention, is calibrated over the full range of environmental temperature conditions. FIG. 17 illustrates one embodiment of a calibration/verification system 500 for the alignment metrology and resolution measurement system in accordance with the present invention. System 500 is shown as including an environmental chamber 160 and two opposing windows 162. The alignment metrology and resolution measurement optics 300 and calibration optics 300A are placed in environmental chamber 160. One of the windows 162 is used for the illumination source and illumination optics, identified using reference numbers 12 and 14 in FIG. 16. The second window is used for an external camera 150. Another embodiment may include a single window for a camera 150, with a means to direct an illumination source towards the opposite end.

The environmental chamber 260 has a temperature control over the range of temperatures under which the device will operate. Further, dry gas (such as dry nitrogen or other inert gas) may be injected into the environmental chamber to minimize moisture content, which may be particularly troublesome at low temperatures. In one embodiment, the windows at each end of the chamber may include two panes separated by dry gas 164. The alignment device 300 and calibration unit 300a are mounted on a structure whose mounting interface is the same as the imaging array 60 to be tested. The alignment metrology and resolution measurement system may be calibrated using external camera 150 to capture the result of the images of the first mask elements within the assembly 300 onto the calibration mask within the second assembly 300a while changing the environmental conditions. With proper choice of materials, the various components of the metrology system remain stable over a wide temperature range. Movement of parts due to thermal expansion or contraction will result in a shift relative to the calibration mask. Detectable changes in the pattern due to changes in thermal environment may therefore be measured and a calibration routine determined and applied to the alignment metrology and resolution measurement system.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A method of concurrently determining six degrees of freedom in position and orientation and resolution of an imaging array in at least one direction relative to a reference frame, the method comprising:
    projecting an image of each of at least three mask patterns on the imaging array, said at least three mask patterns being formed on a first mask and comprising resolution measurement patterns;
    computing a first coordinate position of the imaging array relative to the reference frame using pixel positions of the images along a first axis;
    computing a second coordinate position of the imaging array relative to the reference frame using pixel positions of the images along a second axis;
    computing a first rotational position of the imaging array about a third coordinate axis using pixel positions of the images along the first and second axes and distances between the mask patterns along the first and second coordinates;
    providing a focus image of each of the at least three mask patterns on the imaging array, said focus image of each mask pattern being characterized by an associated distance along a third axis between the mask pattern and the imaging array;
    computing a second rotational position of the imaging array about a first coordinate axis using feature widths of the focus images and the distance between the mask patterns along the second coordinate axis;
    computing a third rotational position of the imaging array about a second coordinate axis using the feature widths of the focus images and the distance between the mask patterns along the first coordinate axis; and
    measuring resolution of the imaging array.

2. The method of claim 1 wherein providing a focus image of at least one of the three mask patterns on the imaging array comprises:
    inserting a transparent medium characterized by a known index of refraction and thickness between the mask and the imaging array.

3. The method of claim 1 wherein each of the at least three patterns is formed on a different one of three sloped areas of the mask, the method further comprising:
    using the computed first rotational position of the imaging array to achieve substantially similar projections of the at least three patterns on the imaging array; and
    computing a value representative of a change in position of the imaging array with respect to the reference frame and along the third axis so that after varying the position of the imaging array in accordance with the value, for each sloped mask pattern, a first portion of an associated image projected on a first side of an in-focus position of the associated image is substantially similar to a second portion of the associated image projected on a second side of the in-focus position of the associated image.

4. The method of claim 1 wherein each of said at least three mask patterns of the first mask comprises a modular transfer function pattern having disposed therein arrays of alternating lines and spaces of fixed widths.

5. The method of claim 1 wherein each of said at least three mask patterns of the first mask comprises a modular transfer function pattern having disposed therein arrays of alternating lines and spaces of varying widths.

6. The method of claim 1 further comprising:
    placing a camera away from the first mask;
    inserting a second mask having formed thereon at least three mask patterns between the first mask and the camera, each of the at least three patterns of the second mask being associated with a different one of the at least three patterns of the first mask, said second mask being positioned at substantially a same location as the imaging array to be tested;
    moving the camera to a first position so as to achieve a focus of the patterns of the first mask on the camera;
    moving the camera to a second position so as to achieve a focus of the patterns of the second mask on the camera; and
    determining a distance between the first and second positions of the camera, said distance representative of a value for use in performing calibration along the third coordinate axis.

7. The method of claim 6 wherein said focus of the patterns of the first mask is characterized by a substantially minimum point of a plot of widths of the projected images of the patterns of the first mask as a function of positions of the camera.

8. The method of claim 7 wherein said focus of the patterns of the second mask is characterized by a substantially minimum of a plot of widths of the projected images of the patterns of the second mask as a function of positions of the camera.

9. The method of claim 3 wherein a first one of the patterns of the first mask is sloped along the first direction.

10. The method of claim 9 wherein the first one of the patterns of the first mask comprises arrays of lines and pinholes along the second direction.

11. The method of claim 1 wherein said reference frame is a camera housing in which the imaging array is disposed.

12. An apparatus adapted to determine a position and orientation of an imaging array relative to a reference plane, the imaging array comprising arrays of photo-sensitive imaging pixels, the apparatus comprising:
    an illumination source;
    a first mask-lens assembly comprising:
        a first mask comprising at least three patterns, the patterns being tilted with respect to the reference plane; and
        a first relay optics comprising at least three pairs of relay lenses each pair being associated with a different one of the at least three mask patterns of the first mask and each adapted to form an image of the associated mask pattern on the imaging array when the illumination source is energized; wherein the first mask-lens assembly is configured to removably receive between the first mask and the first relay optics a selected one of a plurality of transparent media, each transparent medium uniquely characterized by a known index of refraction and thickness.

13. The apparatus of claim 12 further comprising: a second mask-lens assembly comprising: a second mask comprising at least three patterns each having a one-to-one correspondence with a different one of the at least three patterns of the first mask; and a second relay optics comprising at least three pairs of relay lenses each pair being associated with a different one of the at least three mask patterns of the first and second masks and each adapted to form images of the associated first and second mask patterns on an external camera.

14. The apparatus of claim 12 wherein each of said at least three mask patterns of the first mask comprises a modular transfer function pattern having disposed therein arrays of alternating lines and spaces of fixed widths.

15. The apparatus of claim 12 wherein each of said at least three mask patterns of the first mask comprises a modular transfer function pattern having disposed therein arrays of alternating lines and spaces of varying widths.

16. An apparatus adapted to determine a position and orientation of an imaging array relative to a reference plane, the imaging array comprising arrays of photo-sensitive imaging pixels, the apparatus comprising:
an illumination source;
a first mask-lens assembly comprising:
a first mask comprising at least three patterns, wherein at least a first one of said three patterns is formed on a plane that is tilted with regard to the reference plane, and wherein at least a second one of said three patterns is formed on a plane parallel to the reference plane; and
a first relay optics comprising at least three pairs of relay lenses each pair being associated with a different one of the at least three mask patterns of the first mask and each adapted to form an image of the associated mask pattern on the imaging array when the illumination source is energized.

17. The apparatus of claim 16 further comprising:
a second mask-lens assembly comprising: a second mask comprising at least three patterns each having a one-to-one correspondence with a different one of the at least three patterns of the first mask; and
a second relay optics comprising at least three pairs of relay lenses each pair being associated with a different one of the at least three mask patterns of the first and second masks and each adapted to form images of the associated first and second mask patterns on an external camera.

18. The apparatus of claim 16 wherein each of said at least three mask patterns of the first mask comprises a modular transfer function pattern having disposed therein arrays of alternating lines and spaces of fixed widths.

19. The apparatus of claim 16 wherein each of said at least three mask patterns of the first mask comprises a modular transfer function pattern having disposed therein arrays of alternating lines and spaces of varying widths.

* * * * *